United States Patent [19]
Whitney et al.

[11] Patent Number: 5,141,079
[45] Date of Patent: Aug. 25, 1992

[54] TWO COMPONENT CUTTING/COOLING FLUIDS FOR HIGH SPEED MACHINING

[75] Inventors: Raymond A. Whitney, Raleigh; Virginia S. Colvin; David P. Colvin, both of Apex; James C. Mulligan, Raleigh, all of N.C.

[73] Assignee: Triangle Research and Development Corporation, Raleigh, N.C.

[21] Appl. No.: 736,388

[22] Filed: Jul. 26, 1991

[51] Int. Cl.⁵ .............................. F01M 5/00
[52] U.S. Cl. .................... 184/6.14; 184/104.1; 165/104.17; 407/11
[58] Field of Search .......... 184/6.14, 104.1; 165/104.17; 407/11

[56] References Cited

U.S. PATENT DOCUMENTS

| | | | |
|---|---|---|---|
| 3,605,551 | 9/1971 | Steward | 407/11 |
| 3,729,064 | 4/1973 | Wolf et al. | 184/6.14 |
| 4,235,730 | 11/1980 | Schlicht | |
| 4,305,835 | 12/1981 | Barber et al. | |
| 4,513,053 | 4/1985 | Chen et al. | |
| 4,664,822 | 5/1987 | Hunt et al. | |
| 4,708,812 | 11/1987 | Hatfield | |
| 4,747,240 | 5/1988 | Voisinet et al. | |
| 4,767,551 | 12/1989 | Hunt et al. | |
| 4,829,859 | 5/1989 | Yankoff | 407/11 |
| 4,911,232 | 3/1990 | Colvin et al. | 165/104.17 |

Primary Examiner—Albert W. Davis, Jr.
Attorney, Agent, or Firm—Rosenthal & Putterman

[57] ABSTRACT

A method of obtaining enhanced thermal energy between a material forming apparatus and a cooling fluid is disclosed. A two component heat transfer fluid of the type including a carrier fluid and a plurality of discrete particles that undergo a reversible latent energy transition upon the transfer of thermal energy thereto. The temperature of the particles is adjusted (heated or cooled as necessary) to the point of the beginning of latent energy transition of the particles. The fluid is then brought into contact with a heat source such as a metal forming apparatus and a workpiece, proximate the interface therebetween. The slurry may then be collected, adjusted to the point of the beginning of latent energy transition and re-circulated to the heat source.

8 Claims, 6 Drawing Sheets

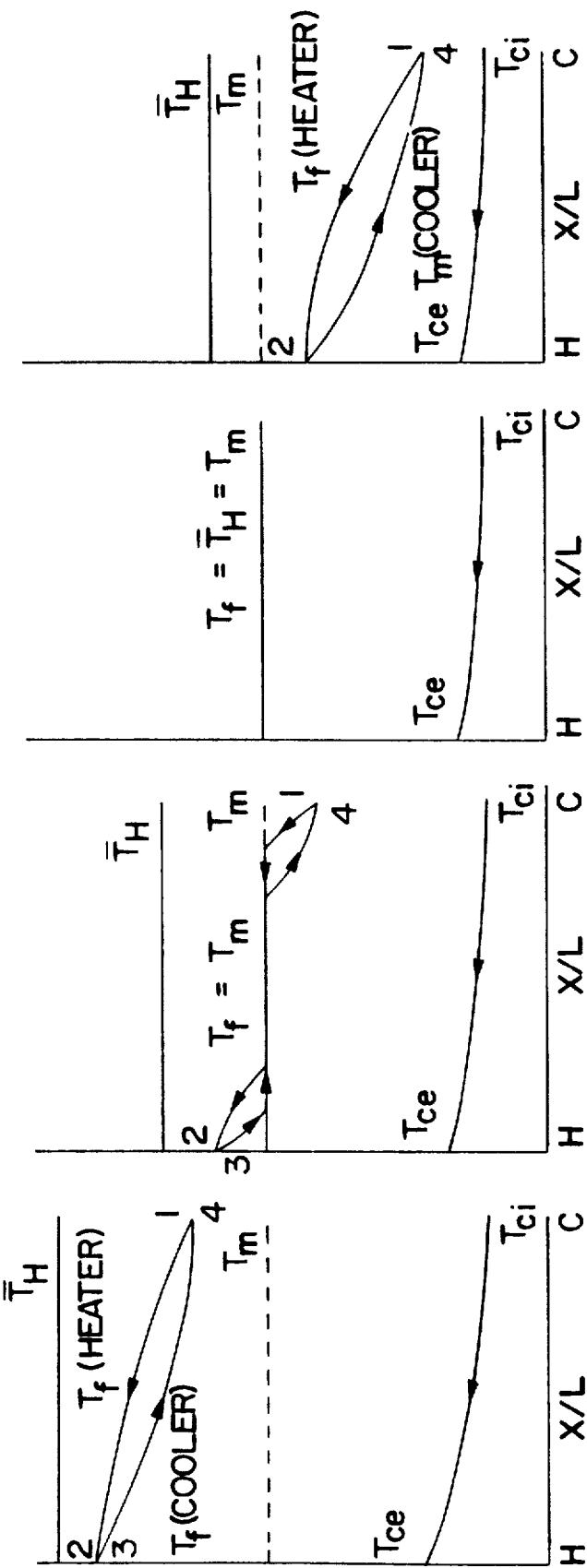

TWO COMPONENT CUTTING/COOLING FLUIDS FOR HIGH SPEED MACHINING

FIELD OF THE INVENTION

This invention relates generally to the field of cooling fluids and more specifically, to cooling fluids of the type used to cool cutting tools and drill bits used in high speed machining.

BACKGROUND OF THE INVENTION

Approximately 60 million gallons of lubricants and cutting fluids are used each year in metal cutting and metal forming operations in the United States at a cost of more than $350 million. This figure represents only a fraction of the cost associated with machines and their tools, bits, production materials, and labor. The selection of coolants or lubricants, however, is important for reasons other than cost. Particular cutting fluids are also selected for their performance: for the quality of the part produced, its accuracy and dimensional stability and finish, surface cleanliness, reduction in tool wear, corrosion protection, ease of machining, especially high-speed machining, and finally, for shop safety and environmental protection.

Materials that are processed into useful parts by cutting and forming operations include metals, alloys, plastics, ceramics, and composites. The removal processes include: turning, milling, broaching, drilling, tapping, cutoff, grinding, polishing, and lapping. These processes apply a tool or an abrasive at sufficient speed or force to remove a given quantity of material. Chip material-forming processes include: forging, rolling, extrusion, rod and wire drawing, tube drawing, deep drawing, swaging, and roll forming. These processes rely on plastic deformation of the material. In material removal processes, the rate of production as well as the life of the tool can be influenced by whether or not an effective cutting fluid is used. Ineffective cooling can lead to thermal distortion of the workpiece that subsequently produces a loss in dimensional tolerances.

The two main functions of cutting fluids are lubrication at relatively low cutting speeds and cooling at relatively high cutting speeds of the tool, chip, and workpiece. By serving these functions, cutting fluids (a) prevent tool, workpiece, and machine overheating, (b) increase tool life, (c) improve surface finish on the workpiece, and (d) help clear the swarf from the cutting area. Cutting fluids are usually either water or oil-based; the oil may be either natural or synthetic. Various methods are used to apply lubricants: dripping, flooding, high pressure jet, misting, and manual brushing. Older methods generally flood the interface area from the top down, but for efficient high-speed machining, a jet directed under the end clearance face and about the chip by high pressure spraying has been found to be very effective.

Water-based fluids have higher heat capacities than those with an oil-base and can sustain increased heat loads during high-speed machining. Water-based fluids, however, promote corrosion in some materials where oil coolants do not. Oil-based fluids normally have one-fourth to one-half the thermal capacity of water, often require higher flow rates, sometimes support bacteria growth, and may become toxic upon evaporation at high temperatures. Additives to some coolants also limit their use with certain materials; for example, lubricating fluids for iron and steel are normally not used with aluminum. Similarly, cutting fluids with chlorine-bearing additives can not be used for machining titanium alloys. There is often concern for the cleanliness of the manufactured part because of the cutting fluids.

Some materials are also more difficult to machine than others. One particularly important quality is thermal conductance—the ability to conduct the heat generated during operation away from the chip formation zones. The heat generated depends on the material and the rate of machining. Thirty to forty years ago, machining speeds for steel were 40 to 70 feet/minute; common high speed machining today approaches speeds of 1,000 feet/minute. The effectiveness of cutting or cooling fluids is related to their contact or dwell time at the tool/workpiece interface. Since this contact time is reduced at high cutting speeds, the role of the cutting fluid is much more important in high-speed machining of materials with limited thermal conductance. High-strength steels and many composites are difficult to machine at high speeds, so improved lubricating or cooling fluids aid the fabrication with these materials. Metals such as high-strength steels and high temperature alloys dull even the best tungsten carbide tools in a short time. In some cases, ceramic tools can replace tungsten carbide tools because they have higher compressive strength and can withstand higher temperatures. However, they are brittle, have low tensile strength, and cannot be used with lubricants. With some plastics and composite materials, the heat generated during high-speed machining is sufficient to plasticize the chip and workpiece.

Operator safety is also a concern in an environment where machinists can become covered with lubricating fluids. One significant threat is the generation of potentially hazardous vapors during high-speed machining. As machine speeds increase, so do the chip-tool interface temperatures that cause evaporation of the cutting fluid. The cost of replacing evaporated fluids increases with the speed of cutting; however, the costs of environmental pollution, of observing OSHA regulations, air-handling equipment, associated energy loss, fluids disposal, and exposure of the operators to increased risk can be significantly higher. Thus, the development of superior cutting fluids that would facilitate enhanced cooling of the cutting tool and workpiece, would improve lubricity and workplace safety, and reduce environmental pollution, would be of great value to the manufacturing industries.

It is, accordingly, an object of the present invention to provide a cooling fluid and method that minimizes the risk of tool, workpiece and machine overheating.

It is another object of the present invention to provide a cooling fluid and method that extends useful tool life.

Yet another object of the present invention is to provide a cooling fluid and method that improves workpiece surface finish.

Still another object of the present invention is to provide a cooling fluid and method that enhances operator safety by reducing toxic fumes.

A still further object of the present invention is to provide a cooling fluid and method that reduces environmental hazards.

SUMMARY OF THE INVENTION

To accomplish the foregoing objects, there is provided a method of obtaining enhanced thermal energy transfer between a heat source such as a material forming apparatus and a cooling fluid. A two component heat transfer fluid of the type including a carrier fluid and a plurality of discrete particles (PCM) that undergo a reversible latent energy transition upon the transfer of thermal energy thereto is provided. The temperature of the particles is adjusted (i.e., heated or cooled as necessary) to the point of the beginning of latent energy transition of the particles. The two component heat transfer fluid (PCM slurry) is then brought into contact with a heat source such as material forming apparatus and a workpiece, proximate the interface therebetween.

BRIEF DESCRIPTION OF THE DRAWINGS

Some of the features and advantages of the invention having briefly been described, others will appear from the detailed description which follows, when taken in connection with the accompanying drawings in which—

FIG. 3a illustrates the temperature profiles for one thermal cycle in the system of FIG. 2. In this figure, the temperature of the PCM slurry always remains above the latent energy transition temperature and the energy transfer of the slurry is all sensible.

FIG. 3b illustrates the temperature profiles of FIG. 3a where the heating rate has been decreased so that the temperature swing of the PCM is centered on the latent energy transition temperature, TM. The energy transfer of the PCM fluid is both sensible and latent.

FIG. 3c illustrates the temperature profiles of FIG. 3b where the PCM temperature is adjusted so that the temperature sensing of the PCM is centered on the latent energy transition temperature, TM, but there is no excursion in temperature above or below the value TM. The energy transfer of the PCM fluid in this case is completely latent, and represents optimal tuned system operation.

FIG. 3d illustrates the temperature profiles of the system of FIG. 2 where temperature of the PCM particles always remains below the latent energy transition temperature, TM, and the energy transfer of the PCM fluid is again all sensible.

DETAILED DESCRIPTION OF THE ILLUSTRATED EMBODIMENT

While the present invention will be described more fully hereinafter with reference to the accompanying drawings, in which a particular embodiment is shown, it is to be understood at the outset that persons skilled in the art may modify the invention herein described while still achieving the favorable results of this invention. Accordingly, the description which follows is to be understood as a broad teaching disclosure directed to persons of skill in the appropriate arts and not as limiting upon the present invention.

Figure 2:
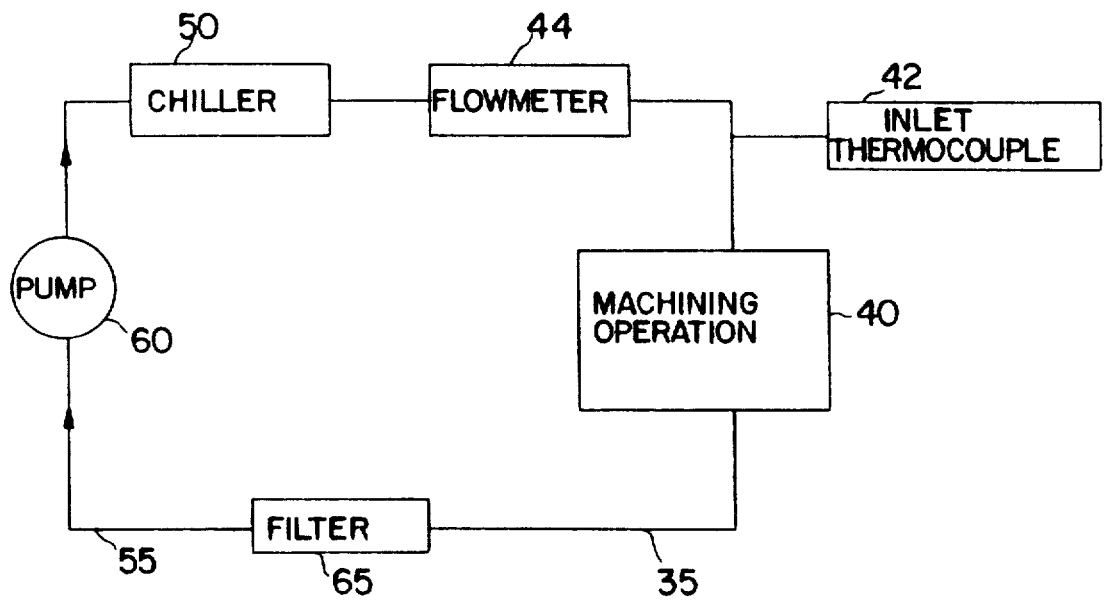
FIG. 2 is a schematic of a tool cooling system according to the present invention illustrating a typical heat source, a chiller/heater and a cooling or rejection heat exchanger.

Referring now to the drawings and particularly to FIG. 2, a typical material forming process in the form of a machining operation in accordance with the present invention is schematically illustrated. Thermal energy is introduced on one side of the heat transport loop 35 in the machining operation as illustrated at 40 and is removed on the other side by a rejection heat exchanger such as a chiller 50. A two component slurry is circulated through the system by means of a pump 60.

The slurry 55 comprises a carrier fluid and a plurality of particles that undergo a reversible latent heat of fusion transition upon heating and cooling. More specifically, the carrier fluid can be almost any fluid depending upon the system requirements in which it must operate. Factors that influence the selection of a particular carrier fluid include temperature, toxicity, viscosity, pressure, etc. However, it will be noted that for the majority of applications, water or any one of a variety of lubricating oils well known to those skilled in the art could be employed. Lubricating oils are often used instead of water to prevent corrosion of the workpiece material in most cases.

The particles that actually absorb the thermal energy can take different forms depending on the temperature requirements of a given application. For relatively low temperature applications, a phase change material (PCM) is microencapsulated within a different material. For higher temperature applications and solid/solid transitions, one component particles can be employed that undergo solid/solid transformation. For still higher temperatures, microencapsulated metals may be used consisting of a metal shell coating over a metal phase change core material.

Figure 1:
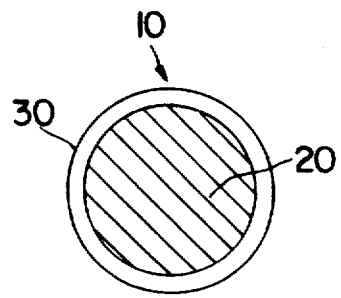
FIG. 1 is a cross-section of a microcapsule containing a phase change material as used in the present invention.

Microencapsulated phase change materials store thermal energy in the form of a physical change of state as the core material melts or freezes or undergoes solid/solid transition. The core material is isolated from the carrier fluid by a thin membrane or shell. FIG. 1 illustrates a microencapsulated particle generally indicated at 10 having a core 20 of a phase change material and a thin shell 30 of another material. Melted core material 20 is thus contained within the surrounding shell 30 and is restricted from mixing with this carrier fluid or from being deposited in undesired locations upon cooling. The technology of microencapsulating various materials, including those that undergo a phase change, is well known to those skilled in the art and further discussion thereof is not deemed necessary.

The one-component, unencapsulated particles may also take the form of a powder suspended within the carrier fluid. At a temperature below their melting point, certain materials may undergo a solid/solid energy transformation that also results in an enforced intake or release of heat at a specific temperature. Both states of the material exhibit a specific endotherm and exotherm corresponding to the enhanced intake or release of heat. When the endotherm and exotherm are close enough together, the possibility exists for tuning a closed loop circuit or system to exhibit significantly enhanced heat transport In this instance, the material remains solid during latent energy transition and a protective shell is not needed.

As stated above, the type of carrier fluid chosen depends largely on the steady state operating temperature of a given material forming operation. The following table illustrates exemplary carrier fluids and their respective operating temperature ranges.

| Common Name | Approximate Temperature Range |
| --- | --- |
| Water | >0 C. to <100 C. |
| Water/glycol mixture | > −40 C. to <110 C. |
| Oils, silicone, hydrocarbons | > −50 C. to <250 C. depending on formulation |
| Liquid sodium | >100 C. to <900 C. |
| Liquid lithium | >180 C. to <1400 C. |

Similarly, latent energy transition materials are chosen so that the melting point occurs at just below the steady state operating temperature of a given material forming operation. The following table illustrates exemplary latent energy transition materials and their approximate transition temperatures.

| Common Name | Approximate Transition Temperature |
| --- | --- |
| Water | 0 C. |
| Tetradecane | 5–6 C. |
| Hexadecane | 17–18 C. |
| Octadecane | 24–27 C. |
| Methyl Palmitate | 30–32 C. |
| Eicosane | 35–39 C. |
| Sodium | 98 C. |
| Lithium | 181 C. |
| Pentaerythritol | 184–186 C. |
| Neopentylglycol | 184–186 C. |
| Tin | 232 C. |
| Bismuth | 271 C. |
| Zinc | 420 C. |
| Barium | 725 C. |
| Eutectic alloys containing Bismuth, Cadmium, Indium, Lead, Tin | 47–138 C. |

Exemplary of shell materials to encapsulate the latent energy transition materials are the following:
Polymers
Polyamids
Silver
Gold
Copper
Nickel
Cobalt It will be noted with respect to the foregoing, that when paraffinic PCM's are microencapsulated, their endotherms and exotherms are usually altered from the pure material Experience has shown that the crystallization of the microencapsulated PCM's is normally affected; i.e., the freezing occurs at lower temperature (supercooling) than with pure paraffinic material. Thus, the difference in temperature between the endotherm and exotherm usually increases when the paraffins are microencapsulated.

According to the present invention, the effective thermal capacitance of the fluid slurry may be increased many times that of the carrier fluid alone (from slightly above one to well over ten times).

Figure 4A:
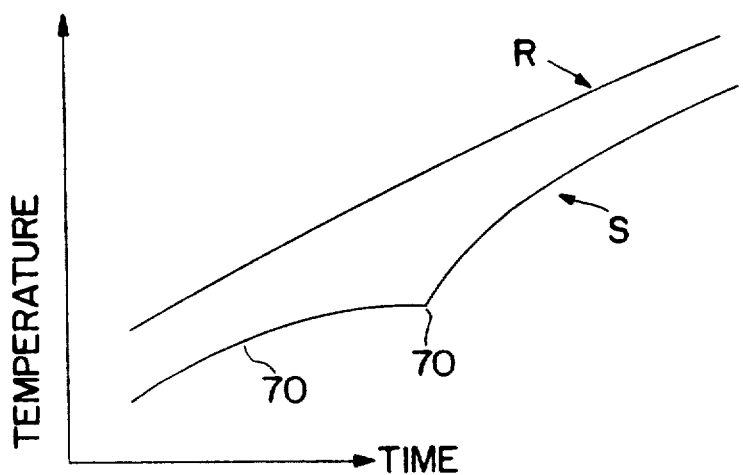
FIG. 4a and 4b illustrate the thermal characteristics of phase change material in heating (endotherm) and cooling (exotherm) cycles, illustrating the latent absorption (or release) of energy at a constant temperature in the plateau portions of the slurry temperature curves.
Figure 4B:
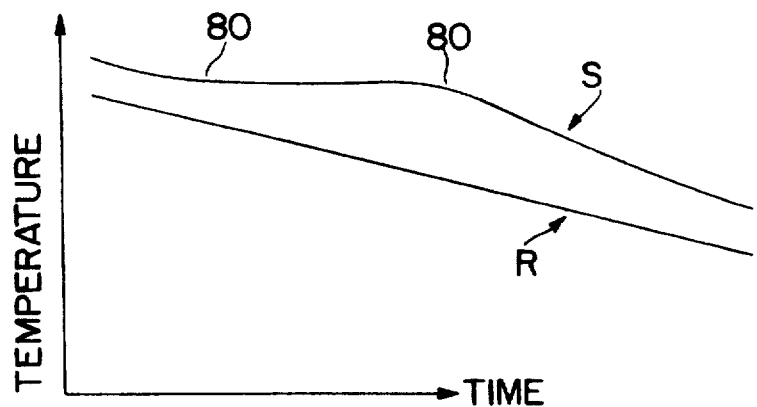

As illustrated in FIGS. 4a and 4b, the latent heat transition in both heating and cooling of the slurry S occurs in an isothermal plateau as compared with a referenced bath R which shows no such plateau. Thus, by carefully adjusting the system parameters, almost all the heat acceptance and heat rejection in the PCM slurry may be confined to the isothermal latent melting plateau 70 and cooling plateau 80 (heat plateaus) as illustrated in FIG. 4. The result is greatly enhanced heat transport, with an attendant decrease in temperature differential across the loop.

Experimental evidence has been obtained to demonstrate that the above described thermal fluid exhibits enhanced heat transport. Unlike two-phase heat transport using liquid to gas heat transitions with its attendant high pressures and large changes in volume, the two-component thermal fluid slurry operates at low pressures and with very small changes in system volume (approximately fifteen percent). Within the slurry, the microparticles store the majority of the thermal energy in the form of latent energy. The circulating loop is tuned to complete the endothermic energy capture just as the particles leave the tool/workpiece interface and then completes the exothermic energy release just as the particles exit the rejection heat exchanger or chiller 50. The heat to be transferred then can occur across a very narrow temperature gradient between the endothermic and exothermic levels. FIG. 4 illustrates the endothermic 70 and exothermic 80 plateaus or levels exhibited by a fluid slurry containing microencapsulated latent energy materials. If the temperature difference or thermal gradient between the thermal slurry endotherm and exotherm is small, it is possible to transport significantly more heat than sensible heat transport can provide under the same conditions of flow. It is this methodology that permits the enhanced nature for heat transport of the two-component thermal fluid slurry. Regardless of whether one uses microencapsulated phase change materials (solid/liquid PCM's) or unencapsulated powders of materials (solid/solid PCM's) that exhibit similar endothermic and exothermic temperature levels, the thermal fluid slurry can be tuned to produce enhanced heat transport characteristics.

FIG. 3 illustrates the dependence of heat transferred with system flow rate, heating rate, and cooling rate. The parameters contained therein are defined as follows:

| | |
| --- | --- |
| $T_f$ = | Fluid Temperature |
| $T_H$ = | Average Temperature of Heater |
| $T_a$ = | Temperature of Latent Energy Material Fluid |
| $T_m$ = | Latent Energy Transition Temperature |
| $T_c$ = | Coolant Temperature (i = inlet, e = exit) |
| $X/L$ = | Cross Section Position in Thermal Loop Between Hot (H) and Cold (C) |

At a particular combination of these variables, the system can be tuned to provide heat transport enhancement. The operating range for tunability is usually narrow, but its location can be determined by differential scanning calorimetry or measurements of the fluid temperature at the exit of the chiller and at the machine/tool interface. Conditions for optimal heat transport will exist when the difference in the fluid temperature is minimized between these points. When this occurs, it indicates that most of the thermal energy is being transported in the form of latent phase or chemical bond energy rather than sensible thermal energy that normally is attributed to the difference in temperature between the aforementioned measurement locations Testing has also revealed a 50 to 100% enhancement for the heat transfer coefficient h.

In general, the following three variables are available for adjustment in order to tune a PCM such as is described above:
1. Heat flux, or heat loaded into the PCM slurry.
2. Slurry flow rate.
3. Cooling capacity from the PCM slurry through the rejection heat exchanger.

A typical operating system may have either a fixed or variable heat load (flux) (generated by machining operation 40) to be dissipated, and a cooling system 50 utilizing chilled water or other coolant at a given inlet temperature (measured by thermocouple 42) and adjustable flow rate (controlled by flowmeter 44). The slurry 55 is then pumped (via pump 60) between the hot and cold sinks for heat transfer as illustrated in FIG. 2. A filter 65 is provided to remove workpiece chips, etc. prior to re-circulation to the tool-workpiece interface.

The temperature of the heat source must be higher than the melting temperature of the microencapsulated PCM, and the cooling temperature must be below the freezing temperature of the PCM.

The slurry flow rate must be adjustable through the laminar flow range or at least over the range of operation. The heat input and heat output heat exchanger in the chiller may be of the type generally suitable to fluid flow heat transfer applications.

It should be noted that the melting and freezing temperature points of a substance are not normally the same. The plateaus in the heating or cooling curves illustrate the latent energy that must be absorbed or released in order to cause a material to change its physical state from a solid to a liquid or visa versa. The closer the melting and freezing temperatures of the PCM are to each other, the greater is the tuning effect, and the greater the thermal enhancement.

FIG. 3 distinguishes between the untuned states above or below the melting temperature (FIG. 3a and 3d), the balanced state (FIG. 3b) and the optimally tuned state (FIG. 3c). As shown in FIG. 3b, the balanced system represents operation around the melting temperature, but FIG. 3c illustrates the practically isothermal condition wherein the temperature gradient $dT = T_3 - T_1$ is minimized. Although the dT can be made to approach zero degrees centigrade, losses in the system sometimes require a temperature differential on the order of a fraction of a degree (0.1 degree centigrade). The following represent actual experimental data illustrating the differences between the tuned, balanced and untuned states for the system variables listed.

The discussion that follows compares the energy expended in a number process parameters when using a standard cutting oil such as Cling-Surface light thread cutting oil No. 26060 manufactured by Cling Surface Company, of Orchard Park, N.Y. and the same cutting oil with 25 weight percent of microencapsulated phase change material added thereto. The microcapsules in the examples cited vary in diameter from 5-25 microns and contain eicosane as the core material. Microcapsules such as employed herein are well known to those skilled in the art and further discussion thereof is not deemed necessary.

Figure 5:
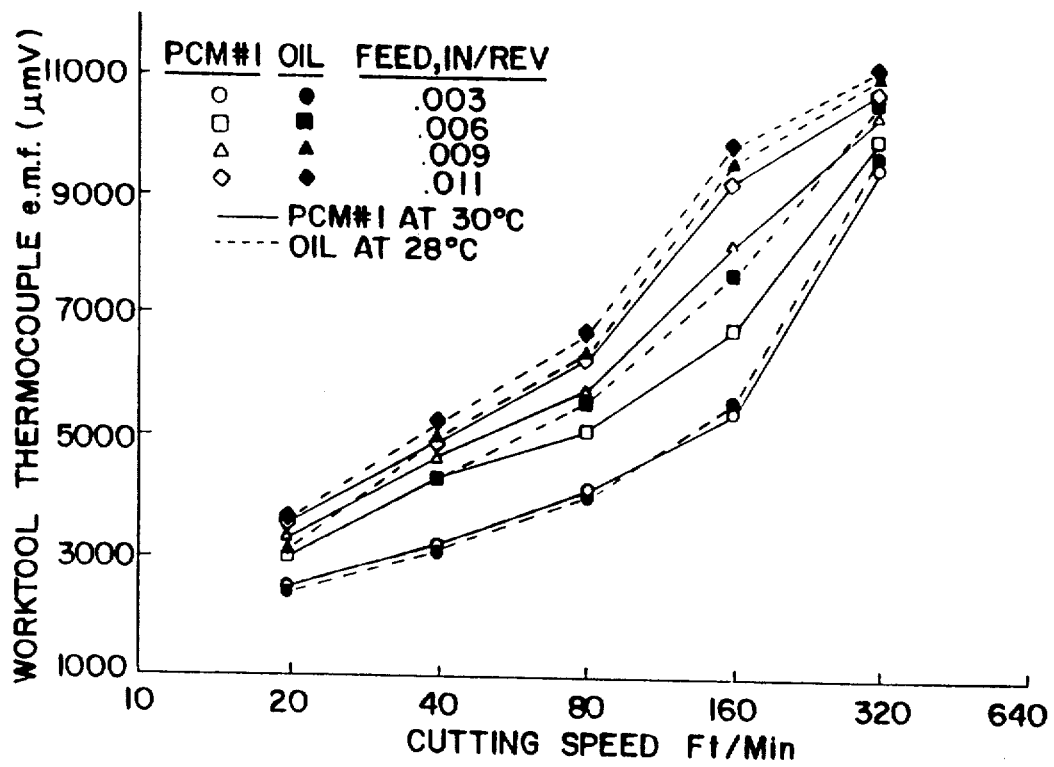
FIG. 5 illustrates the variation of work-tool thermocouple e.m.f. with cutting speed and feed rate for cutting oil containing PCM 1 with 25 weight percent solids, initially at 30 degrees centigrade and oil only at 28 degrees centigrade.

FIG. 5 compares data for two coolants in the same machining system; one for an ordinary cutting oil and another containing microencapsulated PCMs. Both of the coolants were circulated at 28 to 30 degrees centigrade. Little improvement was evident at the lower machine speeds and feed rates due to the low deformation and frictional forces. However, at 160 ft/min and a feed rate of 0.006 in/rev where conditions approached tuned conditions, there was a significant reduction in the worktool thermocouple temperature for the microPCM coolant of 11.7%, while at a feed rate of 0.009 in/rev, the reduction was almost 15%.

Figure 6:
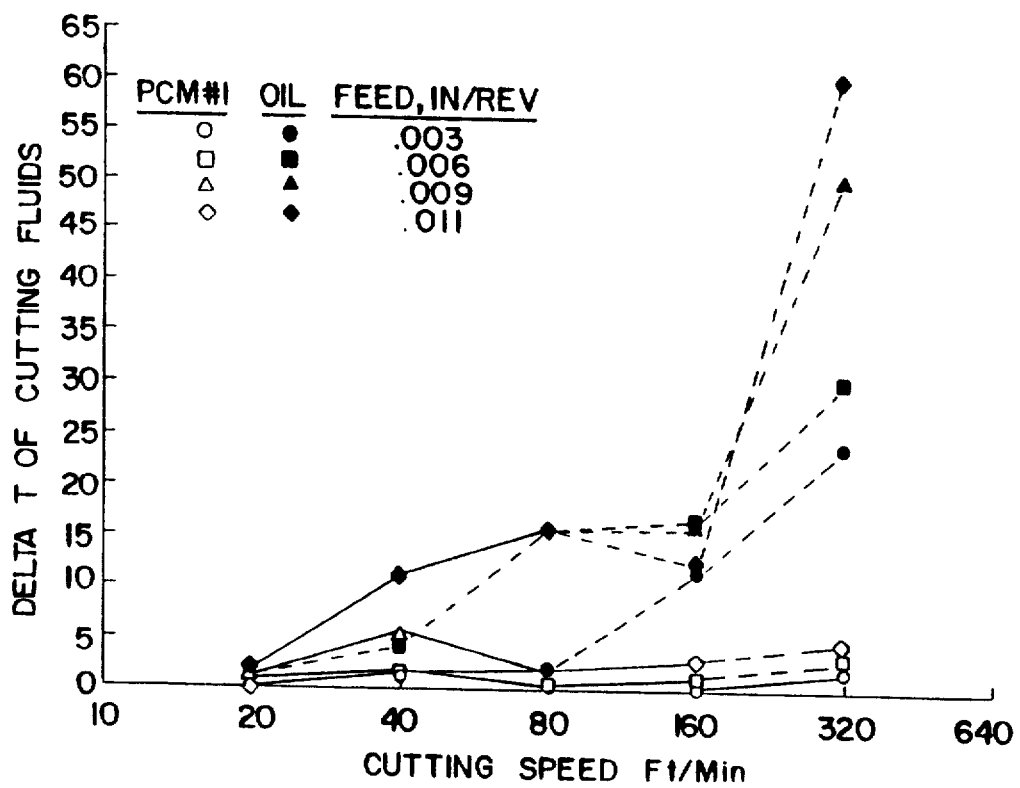
FIG. 6. illustrates the comparison of cutting fluid temperature (degrees centigrade) before and after the workpiece with cutting speed and feed rate for cutting oil with PCM 1 initially at 30 degrees centigrade and oil only at 28 degrees centigrade.

FIG. 6 compares the temperature differential (delta T) across the tool/workpiece of cutting fluids as a function of speed and feed rate. At a cutting speed of 160 ft/min, the change in temperature of the cutting oil was 10 to 15 degrees centigrade and at 320 ft/min, the delta T temperature gradient was from 20 to 60 degrees centigrade, depending upon the feed rate. For the same conditions of cutting speed and feed rate, the PCM cutting fluid was observed to undergo a delta T temperature gradient of less than 5 degrees centigrade—a reduction of over 90%. It is also important to note that for these cutting conditions, the temperature of the PCM cutting fluid bordered the melting and crystallization plateaus of the microparticle core materials. It is at this point; i.e., where the phase change of the particle cores and the full latent thermal capacitance of the PCM capsules is effectively utilized, that the PCM coolant can remove a greater quantity of heat than is possible using ordinary sensible thermal capacitance alone. At the same time, the smoke generated from the evaporating coolant and its environmental impact during high-speed machining operations were observed to be significantly reduced with the PCM coolant. With little evaporation and fluid loss, this could also mean reduced fluid replenishment and greater operator safety.

Figure 7:
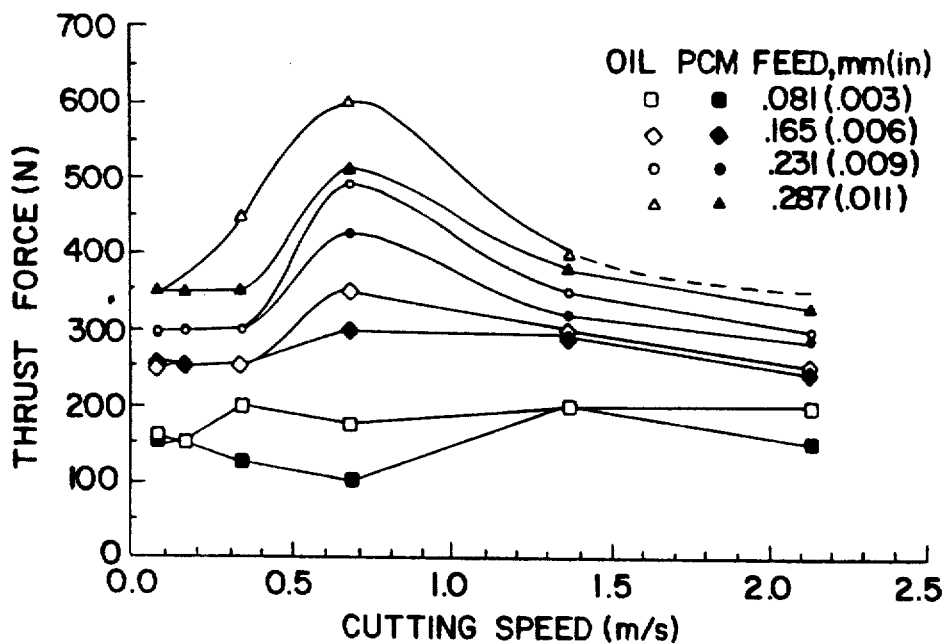
FIG. 7 illustrates the effect of cutting speed and feed on the thrust force component ($F_x$) of the tool forces. The cutting oil and PCM lubricants are initially at seventeen degrees centigrade.
Figure 8:
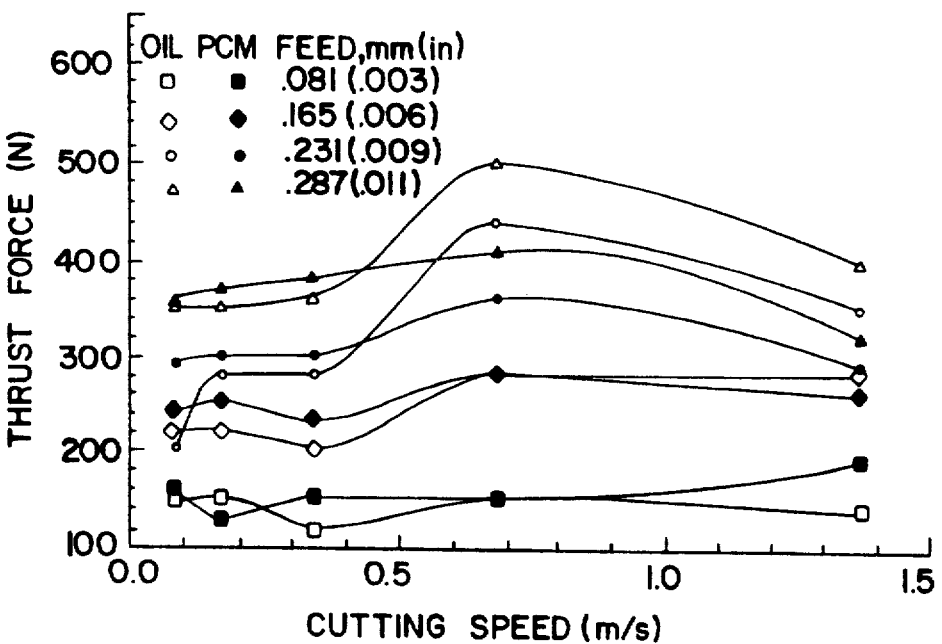
FIG. 8 illustrates the effect of cutting speed and feed on the thrust force component ($F_x$) of the tool forces when using an oil and PCM lubricant, both starting at initial temperatures of 30 degrees centigrade.

Thrust force between the tool and workpiece is necessary for machining operations and also affects the power consumption and tool life. In addition to cooling, cutting fluids also perform as lubricants to reduce these friction and power used in the cutting operation as well as increase the life of the cutting tool. FIG. 7 illustrates the thrust force versus the cutting speed for various feed rates for both a cutting oil and the PCM lubricant or coolant. Even with operation at 17 degrees centigrade which is well below the latent phase change temperature, there is a remarkable improvement in the thrust force for a cutting speed of 0.7 m/s of 20% at the higher feed rates to 75% for lower feed rates. In FIG. 8, however, when the threshold temperature is elevated to 30 degrees centigrade in order to produce a "tuned flow" condition for optimal latent heat absorption and cooling, the reduction in the thrust force is still approximately 25% at the higher feed rates. This reduction in thrust force should result in significantly reduced tool wear, which would translate to a direct economic advantage to the PCM coolants.

Figure 9:
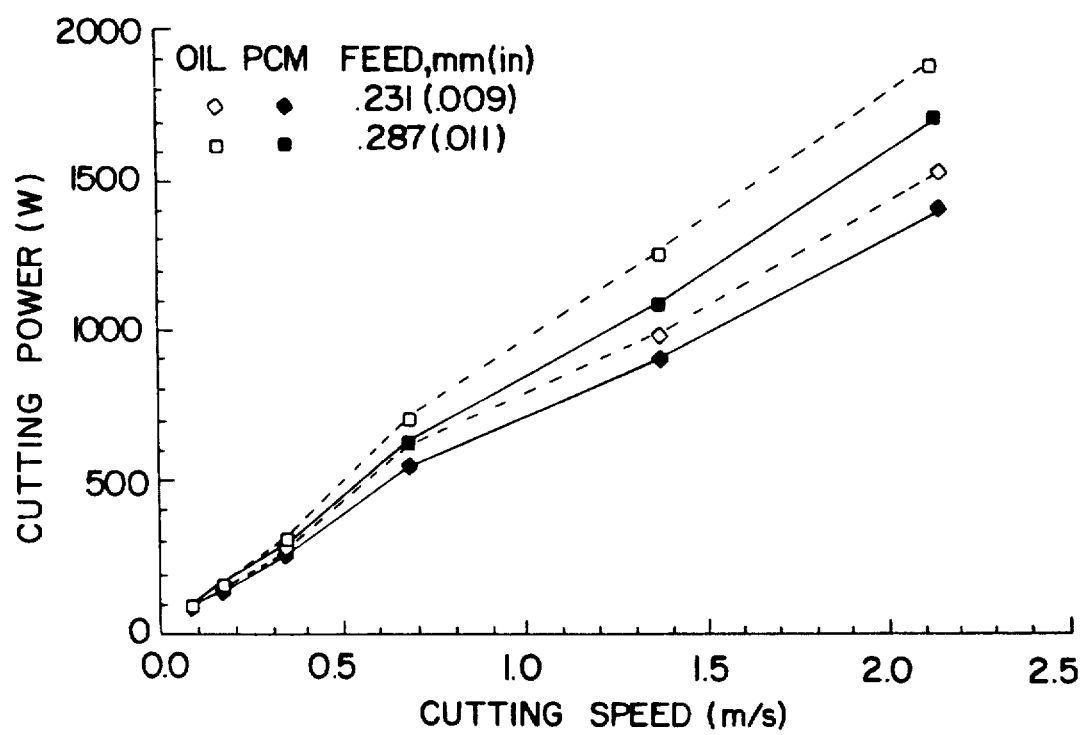
FIG. 9 illustrates the variation of the cutting power with cutting speed and feed. Cutting is performed with the lubricants initially at 17 degrees centigrade.

FIG. 9 also demonstrates a significant reduction (up to 10%) in the cutting power at the higher cutting speeds for the PCM lubricant/coolant when compared to the oil. Therefore, it has been demonstrated that a two-component cutting fluid consisting of microencapsulated phase change materials is a superior machine coolant as well as a better lubricant.

The foregoing embodiments and examples are to be considered illustrative, rather than restrictive of the invention, and those modifications which come within the meaning and range of equivalence of the claims are to be included therein.

That which is claimed is:

1. A method of obtaining enhanced thermal energy transfer between a material forming apparatus and a cooling fluid comprising the steps of:
   (a) adjusting the temperature of a two component heat transfer fluid of the type including a carrier fluid and dispersed throughout the carrier fluid, a plurality of discrete particles that undergo a reversible latent energy transition upon the transfer of thermal energy to the fluid so that thermal energy is transferred thereto, to the point of the beginning of latent energy transition of the particles; and
   (b) directing a flow of the two component heat transfer fluid into contact with the material forming apparatus and a workpiece, proximate the interface therebetween, whereby the ability of the heat transfer fluid to absorb and transfer thermal energy from the material forming apparatus is enhanced.

2. The method of claim 1 further including the steps of collecting the two component heat transfer fluid after it has been in contact with the material forming apparatus and the workpiece interface; and
   readjusting the temperature of the plurality of discrete particles to the point of the beginning of their latent energy transition.

3. The method of claim 2 further including the step of re-directing the flow of the two component heat transfer fluid into contact with the material forming apparatus and workpiece proximate the interface therebetween.

4. The method according to claim 1 wherein the discrete particles comprise a microencapsulated phase change material.

5. The method according to claim 1 wherein the discrete particles comprise a material that undergoes a solid/solid phase transformation.

6. The method according to claim 1 wherein the carrier fluid is water.

7. The method according to claim 6 wherein the carrier fluid comprises a mixture of water and machine oil.

8. The method according to claim 1 wherein the carrier fluid is a machine oil.

* * * * *